United States Patent [19]

Kawachi et al.

[11] Patent Number: 5,718,982
[45] Date of Patent: Feb. 17, 1998

[54] MULTILAYER LAMINATE FILM

[75] Inventors: Hideshi Kawachi; Haruhiko Tanaka, both of Ichihara, Japan

[73] Assignee: Mitsui Petrochemical Industries, Ltd., Tokyo, Japan

[21] Appl. No.: 686,694

[22] Filed: Jul. 26, 1996

[30] Foreign Application Priority Data

Jul. 26, 1995 [JP] Japan ................... 7-190546

[51] Int. Cl.$^6$ ................... B32B 27/08
[52] U.S. Cl. ................... 428/516; 428/214
[58] Field of Search ................... 428/516, 214

[56] References Cited

U.S. PATENT DOCUMENTS

| | | | |
|---|---|---|---|
| 4,511,610 | 4/1985 | Yazaki et al. | 428/35 |
| 4,572,854 | 2/1986 | Dallmann et al. | 428/35 |
| 4,734,331 | 3/1988 | Giles, Jr. et al. | 428/516 |
| 4,753,845 | 6/1988 | Sumi et al. | 428/516 |
| 4,792,484 | 12/1988 | Moritani | 428/516 |

FOREIGN PATENT DOCUMENTS

| | | |
|---|---|---|
| 0118060 | 9/1984 | European Pat. Off. . |
| 0147078 | 7/1985 | European Pat. Off. . |
| 0325952 | 8/1989 | European Pat. Off. . |
| 0370793 | 5/1990 | European Pat. Off. . |
| 55-14204 | 1/1980 | Japan . |
| 60-157830 | 8/1985 | Japan . |
| 2134446 | 8/1984 | United Kingdom . |

*Primary Examiner*—Melvyn I. Marquis
*Attorney, Agent, or Firm*—Sherman and Shalloway

[57] ABSTRACT

A multilayer laminate film comprising (A) a first layer comprising a propylene polymer and oriented in at least one direction, (B) a second layer comprising a propylene copolymer having a melting point lower than the melting point of the propylene polymer of the first layer, (C) a third layer comprising a polymer composition comprising a graft modified olefin polymer in which an unsaturated carboxylic acid or a derivative thereof is grafted, and (D) a fourth layer comprising an ethylene vinyl alcohol copolymer, these four layers being laminated in the above order. The above multilayer laminate exhibits excellent interlaminar adhesion and has excellent heat resistance.

18 Claims, No Drawings

MULTILAYER LAMINATE FILM

DETAILED DESCRIPTION OF THE INVENTION

This invention relates to a multilayer laminate film. More specifically, it relates to a multilayer laminate film comprising a polyolefin layer and an ethylene-vinylalcohol copolymer layer and exhibiting excellent interlaminar adhesion.

Since polyolefin oriented films, particularly polypropylene biaxially oriented films are inexpensive and have excellent transparency and mechanical strength, they are widely used as a package film. However, the polyolefin films are unsatisfactory in terms of a gas barrier property. To improve this defect, a biaxially oriented polypropylene film having a layer coated with an emulsion of polyvinylidene chloride (PVDC) has been used for applications that require odor retention property, such as tobacco packages. However, this film has a possibility to cause a problem when it is incinerated and hence, a substitute film has been desired.

On the other hand, as a material having gas barrier property, there have been also known polar materials such as nylon, ethylene-vinyl alcohol copolymer and the like, and there have been proposed a large number of laminate films consisting of these gas barrier resin layers and polyolefin layers. However, in oriented polyolefin laminate films, adhesion strength between these polar materials and polyolefins has been so low that they could not be put to practical use.

It is therefore an object of the present invention to provide a multilayer laminate film having excellent gas barrier property, transparency and mechanical strength.

It is another object of the present invention to provide a laminate film comprising a polyolefin layer and an ethylene.vinyl alcohol copolymer layer and having excellent interlaminar adhesion.

It is still another object of the present invention to provide a laminate film having excellent heat resistance.

It is a further object of the present invention to provide a laminate film which hardly causes an environmental problem when it is produced, and further is easily incinerated or recycled after use.

Other objects and advantages of the present invention will become apparent from the following description.

According to the present invention, the above objects and advantages can be attained by a multilayer laminate film comprising:

(A) a first layer comprising a propylene polymer and oriented in at least one direction;

(B) a second layer comprising a propylene copolymer having a melting point lower than the melting point of the propylene polymer of the first layer;

(C) a third layer comprising a polymer composition containing a graft modified olefin polymer obtained by graft polymerizing an unsaturated carboxylic acid or a derivative thereof; and (D) a fourth layer comprising an ethylene.vinyl alcohol copolymer, the four layers being laminated in the above order.

The multilayer laminate film of the present invention has the first to fourth layers as described above.

The first layer comprises a propylene polymer and is oriented in at least one direction.

The propylene polymer of the first layer may be a propylene homopolymer or a copolymer of propylene and another α-olefin in an amount of the other α-olefin of 2 mol % or less.

Illustrative examples of the other α-olefin include ethylene, 1-butene, 1-hexene, 4-methyl-1-pentene, 1-octene, 1-decene and the like.

The propylene polymer is preferably a propylene homopolymer.

The propylene polymer having a melt flow rate (MFR) measured in accordance with ASTM D1238 (230° C. under a load of 2,160 g) of 0.01 to 100 g/10 minutes, preferably 0.1 to 10 g/10 minutes, is advantageously used.

Preferably, the first layer is biaxially stretched and oriented.

Any known method for a biaxially stretching is acceptable.

The second layer comprises a propylene copolymer having a melting point lower than the melting point of the propylene polymer of the first layer.

Preferably, this propylene copolymer is a copolymer of propylene and the other α-olefin having a propylene content of 80 to 98 mol %. Illustrative examples of the other α-olefin are the same as those provided for the propylene polymer of the first layer.

Preferred examples of the propylene copolymer of the second layer include a propylene.ethylene random copolymer, a propylene.1-butene random copolymer and a propylene.ethylene.1-butene random copolymer. They may be used alone or in combination of two or more. Preferably, the propylene copolymer of the second layer has a melting point of 120° to 140° C.

The propylene copolymer preferably has a melt flow rate (MFR) measured in accordance with ASTM D1238 (230° C., under a load of 2,160 g) of 0.1 to 100 g/10 minutes, more preferably 1 to 10 g/10 minutes.

The polymer composition of the third layer has a characteristic feature that it comprises a graft modified olefin polymer grafted with an unsaturated carboxylic acid or a derivative thereof. The polymer composition exhibits excellent adhesion to the second layer and the fourth layer due to this graft modified olefin polymer contained therein. The graft modified olefin polymer is preferably contained in the polymer composition in an amount of 1 to 30% by weight, more preferably 1 to 20% by weight. The graft modified olefin polymer is produced by graft polymerizing an olefin polymer with an unsaturated carboxylic acid or a derivative thereof by a known method. Preferred examples of the olefin polymer before graft modification include ethylene homopolymers, propylene homopolymers, copolymers of ethylene and the other α-olefins and copolymers of propylene and the other α-olefins. Examples of the copolymers of ethylene and the other α-olefins include copolymers of ethylene and α-olefins having 3 to 20 carbon atoms, such as propylene, 1-butene, 1-hexene, 4-methyl-1-pentene, 1-octene, 1-decene, 1-tetradecene, 1-octadecene and the like. The other α-olefin is preferably contained in an amount of 10 mol % or less, more preferably 5 mol % or less.

Examples of the copolymers of propylene and the other α-olefins include copolymers of propylene and α-olefins having 2 carbon atoms and 4 to 20 carbon atoms, such as ethylene, 1-butene, 1-hexene, 4-methyl-1-pentene, 1-octene, 1-decene, 1-tetradecene and 1-octadecene. The other α-olefin is preferably contained in an amount of 30 mol % or less, more preferably 10 mol % or less.

Preferred examples of the graft modified polymer include graft modified ethylene copolymers, i.e., graft modified products of copolymers of ethylene and the other α-olefins, and graft modified propylene copolymers, i. e., graft modified products of copolymers of propylene and the other α-olefins.

Illustrative examples of the unsaturated carboxylic acid or the derivative thereof include unsaturated carboxylic acids such as acrylic acid, maleic acid, fumaric acid, tetrahydrophthalic acid, itaconic acid, citraconic acid, crotonic acid, isocrotonic acid, nadic acid (endocis-bicyclo[2.2.1]hepto-5-en-2,3-dicarboxylic acid); and derivatives thereof such as acid halides, amides, imides, anhydrides and esters of these unsaturated carboxylic acid.

Specific examples of the unsaturated carboxylic acid derivatives include malenyl chloride, maleimide, maleic anhydride, citraconic anhydride, monomethyl maleate, dimethyl maleate, glycidyl maleate and the like. Among these, unsaturated dicarboxylic acids and acid anhydrides thereof are preferred, and maleic acid, nadic acid and acid anhydrides thereof are particularly preferred.

The graft modified olefin polymer graft modified with an unsaturated carboxylic acid or a derivative thereof is preferably a graft modified olefin polymer graft modified with 0.05 to 15% by weight, more preferably 0.1 to 10% by weight, of an unsaturated dicarboxylic acid or a derivative thereof, based on the olefin polymer before modification.

The graft modified olefin polymer preferably has a melt flow rate (MFR) at 230° C. of 0.1 to 50 g/10 minutes, more preferably 0.3 to 30 g/10 minutes. The melt flow rate was measured in accordance with ASTM D1238 (190° C. for ethylene polymer and for 230° C. for propylene polymer, under a load of 2,160 g).

The polymer composition of the third layer may contain the other polymer in addition to the above modified olefin polymer. Preferred examples of the other polymer include polyethylene, polypropylene, ethylene.α-olefin random copolymers, propylene.ethylene random copolymers, ethylene.α-olefin copolymer rubber and hydrocarbon resins. Among these, particularly preferred are ethylene.α-olefin random copolymers having an ethylene content of 95 to 90 mol % as exemplified by ethylene-propylene random copolymers and ethylene-butene random copolymers and hydrocarbon resins.

Illustrative examples of hydrocarbon resins include aliphatic hydrocarbon resins produced mainly from $C_4$ and $C_5$ fractions, mixtures thereof and other optional fractions obtained by cracking petroleum, naphtha and the like, for example, isoprene and 1,3-pentadiene contained in the $C_5$ fraction; aromatic hydrocarbon resins produced mainly from styrene derivatives and indenes contained in a $C_9$ fraction obtained by cracking petroleum, naphtha and the like; aliphatic-aromatic copolymer hydrocarbon resins obtained by copolymerizing any one of $C_4$ and $C_5$ fractions and a $C_9$ fraction; alicyclic hydrocarbon resins obtained by hydrogenating aromatic hydrocarbon resins; synthetic terpene-based hydrocarbon resins having a structure including aliphatic, alicyclic and aromatic groups; terpene-based hydrocarbon resins produced from α,β-pinene contained in turpentine oil; coumarone-indene based hydrocarbon resins produced from indene contained in coal tar-based naphtha and styrenes; low molecular weight styrene-based resins and rosin-based hydrocarbon resins.

The hydrocarbon resin may be advantageously contained in the polymer composition of the third layer in an amount of 30% or less by weight.

The polymer composition of the third layer is preferably a polymer composition comprising 50 to 97% by weight of an ethylene.α-olefin random copolymer having a crystallinity measured by an X-ray method of less than 40%, 1 to 20% by weight of a hydrocarbon resin, and 1 to 30% by weight of a graft modified olefin polymer; or a polymer composition comprising 30 to 93% by weight of a propylene.ethylene random copolymer, 5 to 40% by weight of ethylene.α-olefin copolymer rubber, 1 to 20% by weight of high-pressure polyethylene, and 1 to 30% by weight of a graft modified olefin polymer. More preferably, in the former composition, the graft modified olefin polymer is a graft modified ethylene polymer, and in the latter composition, the propylene-.ethylene random copolymer has an ethylene content of 10 mol % or less, more preferably 0.5 to 3 mol %.

The content of these elements in the polymer composition is preferably 35 to 70% by weight. Further, the contents of the ethylene.α-olefin copolymer rubber, the high-pressure polyethylene and the graft modified olefin polymer are preferably 10 to 35% by weight, 5 to 20% by weight and 2 to 20% by weight, respectively.

The fourth layer comprises an ethylene.vinyl alcohol copolymer. The ethylene.vinyl alcohol copolymer preferably has an ethylene content of 20 to 50 mol %. The ethylene.vinyl alcohol copolymer can be prepared by saponifying ethylene and a vinyl acetate copolymer.

The ethylene.vinyl alcohol copolymer used in the present invention preferably has a melting point of 130° to 200° C.

The multilayer laminate film of the present invention may be industrially advantageously produced, for example, by first preparing a double-layer base film consisting of the first and second layers by co-extrusion and a double-layer film consisting of the third and fourth layers by co-extrusion and then laminating the two double-layers in a molten state in such a manner that the second layer and the third layer are arranged adjacent to each other. As a matter of course, the multilayer laminate film of the present invention may also be produced by preparing the first, second, third and fourth layers in advance and laminating them together by heating, or by laminating four layers sequentially, i.e., laminating first and second layers, laminating the resulting laminate with a third layer and laminating the resulting three-layer laminate with a fourth layer.

In the multilayer laminate film of the present invention, the thicknesses of the first, second, third and fourth layers may be 5 to 100 μm, 0.5 to 10 μm, 0.5 to 50 μm and 0.5 to 50 μm, respectively.

The multilayer laminate film of the present invention preferably has a total thickness of 6.5 to 101.5 μm, more specifically 10 to 50 μm.

The multilayer laminate film of the present invention is advantageously used for packing food such as fish, meat, dairy products, coffee, cocoa, spice, seasonings, fruits and the like; tobacco; food additives; and the like. Since it has interlaminar adhesion even at a relatively high temperature, it can be advantageously used when a package is filled with contents before its seal portion is cooled.

The following examples are given to further illustrate the present invention. However, it is understood that the present invention is not limited to these examples.

EXAMPLE 1

(1) As the polymer composition for forming the third layer, a polymer composition (to be referred to as "polymer composition A" hereinafter) comprising 85% by weight of an ethylene.propylene random copolymer (ethylene content: 80 mol %, density: 0.87 g/cm$^3$, MI: 4.5, crystallinity measured by an X-ray diffraction method: less than 1%), 10% by weight of an aliphatic hydrocarbon resin (manufactured by Arakawa Chemical Co. Ltd, trade name: Arcon, softening point: 125° C.), and 5% by weight of maleic anhydride-grafted polyethylene (ethylene content: 100%, graft ratio: 2% by weight, MI: 5) was prepared.

(2) The polymer composition A and an ethylene-vinyl alcohol copolymer (manufactured by Kuraray Co. Ltd, Eval EP-L105 (to be abbreviated as EVOH hereinafter)) were supplied to a double-layer extrusion laminator (die width: 500 mm) to obtain a 8 μm thick coextrusion laminate consisting of a 4 μm thick layer of the polymer composition A and a 4 μm thick layer of the ethylene.vinyl alcohol copolymer. The laminate was immediately laminated with a double-layer base film consisting of a first layer (A) and a second layer (B) in such a manner that the layer of the polymer composition A was placed directly on the second layer (B) of the base film, whereby a four-layer laminate film was produced. The first layer (A) of this double-layer base film is a biaxially oriented layer of a propylene homopolymer having an MFR (230° C.) of 1.2 and a thickness of 23 μm, and the second layer (B) is a layer of a propylene.1-butene copolymer (1-butene content: 15 mol %, melting point: 135° C.) having a thickness of 2 μm.

The thus obtained four-layer laminate was measured for interlaminar adhesion (g/15 mm) between the second layer and the third layer and interlaminar adhesion (g/15 mm) between the third layer and the fourth layer (peel rate of 300mm/min). Results are shown in Table 1.

EXAMPLE 2

As the polymer composition, a polymer composition B comprising 85% by weight of an ethylene.1-butene random copolymer (ethylene content: 90 mol %, crystallinity measured by an X-ray diffraction method: 20% density: 0.88 g/cm$^3$ MI: 3.6), 10% by weight of an alicyclic hydrocarbon resin (manufactured by Arakawa Chemical Co. Ltd, trade name: Arcon, softening point: 125° C.), and 5% by weight of maleic anhydride modified polyethylene (ethylene content: 100%, graft ratio: 2% by weight, MI: 5) was prepared.

A four-layer laminate was obtained in the same manner as in Example 1 except the polymer composition B was used in place of the polymer composition A. The adhesion of this laminate is shown in Table 1.

EXAMPLE 3

As the polymer composition, a polymer composition C comprising 50% by weight of a propylene.ethylene random copolymer (ethylene content: 2 mol %, MI: 20), 30% by weight of an ethylene.propylene random copolymer (ethylene content: 70 mol %, density: 0.88 g/cm$^3$, MI: 45), 10% by weight of high-pressure polyethylene (ethylene content: 100%, density: 0.917 c/cm$^3$, MI: 7), and 10% by weight of maleic anhydride graft polypropylene (propylene content:. 100%, graft ratio: 3% by weight, MI: 100) was prepared.

A four-layer laminate was obtained in the same manner as in Example 1 except that the polymer composition C was used in place of the polymer composition A. The adhesion of this laminate is shown in Table 1.

EXAMPLE 4

As the polymer composition, a polymer composition D comprising 45% by weight of an ethylene.1-butene random copolymer (ethylene content: 90% by weight, density: 0.89 g/cm$^3$, MI; 18), 30% by weight of an ethylene.4-methyl-1-pentene copolymer (ethylene content: 96% by weight, density: 0.920 g/cm$^3$, MI: 8), 10% by weight of high-pressure polyethylene (ethylene content: 100%, density: 0.917 g/cm$^3$, MI: 7), 10% by weight of an alicyclic hydrocarbon resin (softening point: 125° C.) and 5% by weight of maleic anhydride graft modified polyethylene (ethylene content: 100%, graft ratio: 2% by weight, MI: 5) was prepared.

A four-layer laminate was obtained in the same manner as in Example 1 except that the polymer composition D was used in place of the polymer composition A. The adhesion of this laminate is shown in Table 1.

TABLE 1

| Ex. | Polymer composi-tion | Adhesion between 2nd and 3rd layers | | | Adhesion between 3rd and 4th layers | | |
|---|---|---|---|---|---|---|---|
| | | 23° C. | 60° C. | 80° C. | 23°°C. | 63° C. | 80° C. |
| 1 | A | 7,600 | (10) | 10 | 600 | 10 | 2 |
| 2 | B | 510 | 2340 | unpeel-able | 320 | 340 | 21 |
| 3 | C | 320 | 60 | 38 | 320 | 60 | 38 |
| 4 | D | 410 | 220 | 5 | 200 | 170 | unpeel-able |
| 5 | B | 150 | 140 | 60 | 300 | 310 | 30 |

Ex. = Example

Comparative Example 1

A three-layer laminate was obtained in the same manner as in Example 2 except that a biaxially oriented single-layer film comprising a propylene homopolymer and having a thickness of 20 μm was used as a base film. The thus obtained three-layer laminate was measured for adhesion between first and second layers and adhesion between the second and third layers. Results are shown in Table 2.

Comparative Example 2

A three-layer laminate was obtained in the same manner as in Example 3 except that a biaxially oriented propylene single-layer polymer film (MFR at 230°C.: 1.2, thickness: 20 μm) was used as a base film. The thus obtained three-layer laminate was measured for adhesion between first and second layers and adhesion between the second and third layers. Results are shown in Table 2.

TABLE 2

| Comp. Ex. | Polymer com-posi-tion | Adhesion between 2nd and 3rd layers | | | Adhesion between 3rd and 4th layers | | |
|---|---|---|---|---|---|---|---|
| | | 23° C. | 60° C. | 80° C. | 23° C. | 60° C. | 80° C. |
| 1 | B | 100 | 120 | 30 | 340 | 350 | 20 |
| 2 | C | 30 | 20 | 5 | 350 | 70 | 40 |

Comp. Ex. = Comparative Example

EXAMPLE 5

A four-layer laminate was obtained in the same manner as in Example 2 except that the second layer comprising a propylene.ethylene random copolymer having a melting point of 147° C. (ethylene content: 2.3 mol %) was used as a base film. The thus obtained four-layer laminate was measured for adhesion between the second and third layer and adhesion between the third and fourth layers. Results are shown in Table 3.

TABLE 3

| Ex. | Polymer composi-tion | Adhesion between 2nd and 3rd layers | | | Adhesion between 3rd and 4th layers | | |
|---|---|---|---|---|---|---|---|
| | | 23° C. | 60° C. | 80° C. | 23° C. | 60° C. | 80° C. |
| 5 | B | 150 | 140 | 60 | 300 | 310 | 30 |

Ex. = Example

What is claimed is:

1. A multilayer laminate film comprising:
   (A) a first layer comprising a propylene homopolymer or copolymer of propylene and 2 mol % or less of another α-olefin, and said first layer being oriented in at least one direction;

(B) a second layer comprising a propylene copolymer having a melting point lower than the melting point of the propylene polymer of the first layer;

(C) a third layer comprising a polymer composition comprising a graft modified olefin polymer in which an unsaturated carboxylic acid or a derivative thereof is grafted; and (D) a fourth layer comprising an ethylene-vinyl alcohol copolymer, these four layers being laminated in the above order.

2. The multilayer laminate film according to claim 1, wherein the first layer is biaxially oriented.

3. The multilayer laminate film according to claim 1, wherein the propylene copolymer of the second layer has a propylene content of 80 to 98 mol %.

4. The multilayer laminate film according to claim 3, wherein the propylene copolymer of the second layer is at least one random copolymer selected from the group consisting of propylene.ethylene random copolymer, propylene.1-butene random copolymer and propytene.ethylene.1-butene random copolymer.

5. The multilayer laminate film according to claim 1, wherein the propylene copolymer of the second layer has a melting point of 120° to 140° C.

6. The multilayer laminate film according to claim 1, wherein the graft modified olefin polymer contained in the polymer composition of the third layer is a graft modified ethylene copolymer or a graft modified propylene copolymer.

7. The multilayer laminate film according to claim 6, wherein the polymer composition of the third layer contains 1 to 30% by weight of a graft modified olefin polymer.

8. The multilayer laminate film according to claim 7, wherein the polymer composition of the third layer comprises 50 to 97% by weight of an ethylene.α-olefin random copolymer having a crystallinity, measured by an X-ray method, of less than 40%, 1 to 20% by weight of a hydrocarbon resin, and 1 to 30% by weight of a graft modified olefin polymer.

9. The multilayer laminate film according to claim 1, wherein the polymer composition of the third layer comprises 30 to 93% by weight of a propylene.ethylene random copolymer, 5 to 40% by weight of ethylene.α-olefin copolymer rubber, 1 to 20% by weight of high-pressure polyethylene, and 1 to 30% by weight of a graft modified olefin polymer.

10. The multilayer laminate film according to claim 1, wherein the ethylene-vinyl alcohol copolymer of the fourth layer has an ethylene content of 20 to 50 mol %.

11. The multilayer laminate film according to claim 1, wherein the first, second, third and fourth layers have a thickness of 5 to 100 µm, 0.5 to 10 µm, 0.5 to 50 µm and 0.5 to 50 µm, respectively.

12. The multilayer laminate film according to claim 11, wherein the total thickness of the first, second, third and fourth layers is in the range of 10 to 50 µm.

13. The multilayer laminate film according to claim 1 wherein the first layer is formed from propylene homopolymer.

14. The multilayer laminate film according to claim 13 wherein the propylene homopolymer has a melt flow rate, measured in accordance with ASTM D1238 (230° C. under load of 2160 g) of 0.1 to 10 g/10 minutes.

15. The multilayer laminate film according to claim 4 wherein the propylene copolymer of the second layer has a melting point of 120° to 140° C.;

the graft modified olefin polymer in the polymer composition of the third layer is a graft modified ethylene copolymer or graft modified propylene copolymer, said graft modified olefin polymer being present in an amount of 1 to 30 weight percent of the polymer composition; and the ethylene-vinyl alcohol copolymer of the fourth layer has an ethylene content of 20 to 50 mol %.

16. The multilayer laminate film according to claim 15 wherein the first layer is formed from propylene homopolymer and is biaxially oriented.

17. The multilayer laminate film according to claim 15 wherein the polymer composition of the third layer comprises 50 to 97% by weight of ethylene-α-olefin random copolymer having a crystallinity, measured by an X-ray method, of less than 40%, 1 to 20% by weight of hydrocarbon resin, and 1 to 30% by weight of said graft modified olefin polymer.

18. The multilayer laminate film according to claim 15 wherein the polymer composition of the third layer comprises 30 to 93% by weight of propylene-ethylene random copolymer, 5 to 40% by weight of ethylene-α-olefin copolymer rubber, 1 to 20% by weight of high-pressure polyethylene, and 1 to 30% by weight of said graft modified olefin polymer.

* * * * *